United States Patent
Jing

(10) Patent No.: US 6,685,793 B2
(45) Date of Patent: Feb. 3, 2004

(54) FLUOROPOLYMER BONDING COMPOSITION AND METHOD

(75) Inventor: Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/862,125

(22) Filed: May 21, 2001

(65) Prior Publication Data

US 2003/0077454 A1 Apr. 24, 2003

(51) Int. Cl.$^7$ .............................................. B32B 31/26
(52) U.S. Cl. .............................. 156/272.2; 156/272.8; 156/275.7; 156/327; 427/508; 427/595
(58) Field of Search .................. 156/272.2, 272.8, 156/275.7, 325, 326, 327, 333; 428/421, 422; 427/487, 508, 595

(56) References Cited

U.S. PATENT DOCUMENTS

| | | | |
|---|---|---|---|
| 2,516,303 A | 7/1950 | Dickey | |
| 2,789,063 A | 4/1957 | Purvis et al. | 117/47 |
| 3,563,871 A | 2/1971 | Newman et al. | 204/159.14 |
| 4,112,139 A | 9/1978 | Shirk et al. | 427/54 |
| 4,164,463 A | 8/1979 | Fang | 204/296 |
| 4,186,084 A | 1/1980 | Fang | 210/23 H |
| 4,233,421 A | 11/1980 | Worm | 525/343 |
| 4,261,800 A | 4/1981 | Beckenbaugh et al. | 204/15 |
| 4,338,237 A | 7/1982 | Sulzbach et al. | 524/777 |
| 4,613,653 A | 9/1986 | Kitchens et al. | 525/352 |
| 4,775,449 A | 10/1988 | Dumas et al. | 204/30 |
| 4,824,692 A | 4/1989 | Gillick et al. | 427/53.1 |
| 4,912,171 A | 3/1990 | Grootaert et al. | 525/340 |
| 4,933,060 A * | 6/1990 | Prohaska et al. | 204/192.36 |
| 5,051,312 A | 9/1991 | Allmér | 428/458 |
| 5,086,123 A | 2/1992 | Guenthner et al. | 525/276 |
| 5,262,490 A | 11/1993 | Kolb et al. | 525/343 |
| 5,284,611 A | 2/1994 | Grootaert et al. | 264/135 |
| 5,285,002 A | 2/1994 | Grootaert | 526/222 |
| 5,320,789 A | 6/1994 | Nishii et al. | 264/22 |
| 5,419,968 A | 5/1995 | Okada et al. | 428/421 |
| 5,470,617 A | 11/1995 | Nishii et al. | 427/521 |
| 5,478,652 A | 12/1995 | Grootaert et al. | 428/422 |
| 5,580,616 A | 12/1996 | Niino et al. | 427/554 |
| 5,656,121 A | 8/1997 | Fukushi | 156/326 |
| 5,658,671 A | 8/1997 | Fukushi | 428/421 |
| 5,734,085 A | 3/1998 | Coggio et al. | 568/19 |
| 5,859,086 A | 1/1999 | Freund et al. | 522/83 |
| 6,117,497 A | 9/2000 | Murahara et al. | 427/581 |
| 6,255,384 B1 | 7/2001 | McCarthy et al. | 524/805 |

FOREIGN PATENT DOCUMENTS

| | | |
|---|---|---|
| EP | 0 479 592 A2 | 4/1992 |
| EP | 0 769 517 A1 | 4/1997 |
| GB | 1 509 842 | 5/1978 |

(List continued on next page.)

OTHER PUBLICATIONS

*Semiconductor International,* 11, Burggraf, Pieter, No. 8, 55 (1988).

*Appl. Phys. Lett.,* vol. 54, No. 1, Jan. 2, 1989, ©1988 American Institute of Physics, "Ablation of Polytetrafluoroethylene (Teflon) with Femtosecond UV Excimer Laser Pulses", S. Küper and M. Stuke, p. 4–6.

*Appl. Phys. Lett.,* Vol 63, No. 25, Dec. 20, 1993, "Surface Modification and Metallization of Fluorocarbon Polymers by Excimer Laser Processing", H. Niino and A. Yabe.

(List continued on next page.)

Primary Examiner—Jeff H. Aftergut
Assistant Examiner—John T. Haran
(74) Attorney, Agent, or Firm—James V. Lilly; Brian E. Szymanski

(57) ABSTRACT

A multi-layer structure includes a layer of a fluoropolymer bonded to a substrate. The structure is prepared by exposing a bonding composition to actinic radiation, such as ultraviolet radiation, to form the bond. The bonding composition includes a light-absorbing electron donor.

44 Claims, 1 Drawing Sheet

FOREIGN PATENT DOCUMENTS

| JP | 01 22567 4 A | 9/1989 | |
|---|---|---|---|
| JP | 06-279590 | 10/1994 | ............... C08J/3/28 |
| JP | 07-179628 | 7/1995 | ............... C08J/7/00 |
| JP | 07-179636 | 7/1995 | ............... C08J/7/18 |
| JP | 09-193164 | 7/1997 | ............ B29C/33/38 |
| JP | 2000-256488 | 9/2000 | ............... C08J/7/00 |
| WO | WO 96/05965 A1 | 2/1996 | ............ B32B/27/28 |

OTHER PUBLICATIONS

*Chemistry Letters*, pp. 1637–1638, 1993; ©The Chemical Society of Japan, "Endowment With The Wettability On The Surface of Tetrafluoroethylene–Perfluoroalkyl Vinyl Ether Copolymer By Excimer Laser Irradiation"; Atsushi Okada, Yasuo Negishi, Yuichi Shimizu, Shun'ichi Sugimoto, Masanobu Nishii, and Shunichi Kawanishi.

Elsevier, *Applied Surface Science 109/110*(1997) p. 222–226, "Excimer Laser Induced Surface Chemical Modification of Polytetrafluoroethylene", K. Révész, B. Hopp, Z. Bor.

Dahm, R. in: "Surface Analysis and Pretreatment of Plastics and Metals", Applied Science Publishers, New York, 1982, p. 1–11.

Siperko, L.M.; Thomas, R.R.; *Journal Adhesion Sci, Technol.* 1989, vol. 3, p. 157.

Rye, R.R.; Arnold, G.W.; *Langmuir*, 1989, vol. 5, p. 1331.

Clark, D.T.; Hutton, D.R.; *Journal Polym.Sci., Polym. Chem. Ed.*, 1987, vol. 25, p. 2643.

Weismann, S.I.; *Journal Phys. Chem.*, 1954, vol. 22, p. 1135.

Yao, T.; Musha, S.; Munemori, M.; *Chem.Lett.*, 1974, p. 939.

Allmer, K.; Feiring, A.E.; *Macromolecules* 1991, vol. 24, p. 5487.

Costello, C.A.; McCarthy, T.J.; *Macromolecules* 1984, vol. 17, p. 2941.

Iqbal, Z.; Ivory, D.M.; Szobota, J.S.; Elsenbaumer, R.L.; Baughman, R.H.; *Macromolecules,* 1986, vol. 19, p. 2992.

Kiplinger, J.L.; Richmond, T.G.; Osterberg, C.E.; *Chem Rev.* 1994, vol. 94, p. 341.

MacNicol, D.D.; Robertson, C.D.; *Nature* 1988, 332, 59.

Cooper, D.L.; Allan, N.L.; Powell, R.L.; *Journal Fluorine Chem.*, 1990, vol. 49, p. 421.

Marsella, J.A.; Gilicinski, A.G.; Coughlin, A.M.; Pez, G.P.; *Journal Organic Chem.*, 1992, vol. 57, p. 2856.

Burdeniuc, J.; Chupka, W.; Crabtree, R.H.; *Journal Am. Chem. Soc.,* 1995, 117, 10119.

Burdeniuc, J.; Crabtree, R.H.; *Science,* 1996, 271,340.

Kaprinidis, N.A.; Turro, N.J.; *Tetrahedron Lett.,* 1996, 37, 2373.

Plueddemann, E.P.; *Silane Coupling Agents,* 1982, Plenum Press, NY, pp. 188–205.

Plueddemann, E.P.; *Silane Coupling Agents,* Second Edition, 1991, Plenum Press, NY, pp. 101–113.

*Chemlok® 607,* "Silicone Rubber & Specialty Elastomer Adhesive", Lord Corporation.

Related application U.S. Ser. No. 09/862,022, Filed May 21, 2001, Attorney Docket No. 56210US002.

Related application U.S. Ser. No. 09/862,124, filed May 21, 2001, Attorney Docket No. 56211US002.

Sheppard W.A., *The Electronic Properties of Fluoroalkyl Groups Fluorine P–PI Interaction,* Journal of the American Chemical Society, American Chemical Society, Washington, D.C., U.S., vol. 87, No. 11, Jun. 5, 1965, pp. 2410–2420, XP002942156, ISSN: 0002–7863, p. 2413, table 1.

\* cited by examiner

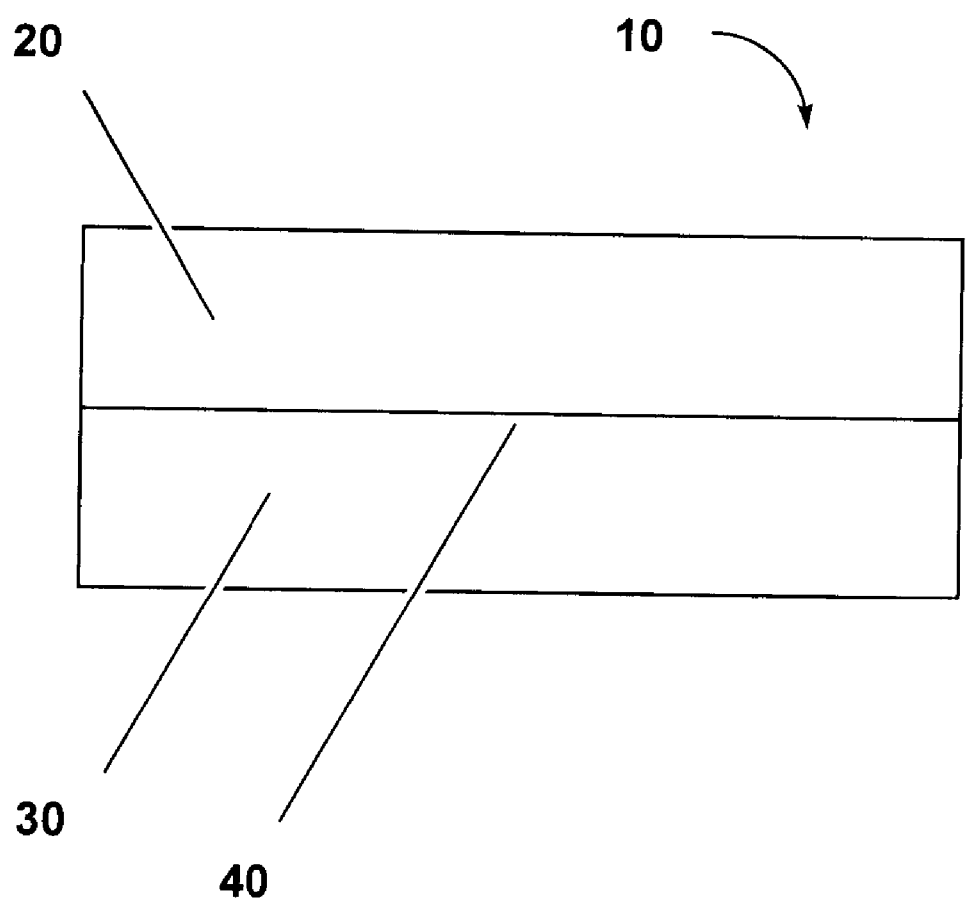

FLUOROPOLYMER BONDING COMPOSITION AND METHOD

TECHNICAL FIELD

This invention relates to methods and compositions for bonding a fluoropolymer to a substrate.

BACKGROUND

Fluorine-containing polymers (also known as "fluoropolymers") are a commercially useful class of materials. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, it is often difficult to establish high bond strengths when one of the layers is a fluoropolymer, in part, because of the non-adhesive qualities of fluoropolymers. Various methods have been proposed to address this problem. One approach is to use an adhesive layer or tie layer between the fluoropolymer layer and the second polymer layer. Surface treatments for the fluoropolymer layer, including the use of powerful reducing agents (e,g., sodium naphthalide) and corona discharge, have also been employed to enhance adhesion. In the case of fluoropolymers containing interpolymerized units derived from vinylidene fluoride, exposure of the fluoropolymer to a dehydrofluorinating agent such as a base has been used, as well as polyamine reagents applied to the fluoropolymer surface or incorporated within the fluoropolymer itself.

SUMMARY

A multi-layer structure includes a fluoropolymer bonded to a substrate, such as a hydrocarbon polymer. The structure is prepared by exposing a bonding composition to actinic radiation, such as ultraviolet radiation, with optional heating, pressure, or combination thereof, to form the bond. The bonding composition includes a light-absorbing electron donor. The bonding composition may be free of adhesive materials.

In one aspect, a method of bonding a fluoropolymer to a substrate includes providing a bonding composition between a fluoropolymer and a substrate, and exposing the bonding composition to actinic radiation.

In another aspect, a method of bonding a fluoropolymer to a substrate includes treating a surface of a fluoropolymer with a bonding composition, contacting the surface of the fluoropolymer with a surface of a substrate, and exposing the bonding composition to actinic radiation. In certain embodiments, exposing the bonding composition to actinic radiation may occur prior to contacting the surface of the fluoropolymer with the substrate.

In another aspect, a method of bonding a fluoropolymer bonded to a substrate includes forming a mixture of a substrate and a bonding composition, contacting the surface of the mixture with a surface of a fluoropolymer, and exposing the bonding composition to actinic radiation.

In yet another aspect, a treated fluoropolymer substrate suitable for bonding to a polymeric substrate includes a surface exposed to a combination of a light-absorbing electron donor and actinic radiation.

The bonding composition may be provided between the fluoropolymer and the substrate in different ways. For example, a surface of the fluoropolymer may be treated with the bonding composition and the treated surface of the fluoropolymer may be contacted with a surface of the substrate, or a surface of the substrate may be treated with the bonding composition and the treated surface of the substrate may be contacted with a surface of the fluoropolymer. In certain embodiments, a mixture of the fluoropolymer and the bonding composition may be extruded and a surface of the extruded mixture may be contacted with a surface of the substrate. In other embodiments, the substrate or the fluoropolymer may be cast from solution or polymerized from a monomer.

In certain embodiments, the method may include heating the bonding composition after exposure to actinic radiation. The bonding composition may be exposed to actinic radiation through the fluoropolymer.

In another aspect, a composite article includes a fluoropolymer having a surface, a substrate having a surface, and a bonding composition interposed between the surface of the fluoropolymer and the surface of the substrate. In still another aspect, an article includes a fluoropolymer layer laminated to a substrate layer wherein the substrate layer includes a light-absorbing electron donor.

In another aspect, a method of treating a fluoropolymer surface includes applying a fluorinated amine or fluorinated aniline to a fluoropolymer surface, and exposing the bonding composition to actinic radiation.

In another aspect, a composition includes at least one of N-methyl-N-2,2,2-trifluoroethylaniline, N-2,2,2-trifluoroethylaniline, 4-(n-perfluorobutyl)-N,N-dimethylaniline, 4-(pentafluoroisopropyl)-N,N-dimethylaniline, 4-(perfluorotetrahydrofurfuryl)-N,N-dimethylaniline, and diethyl-2,2,2-trifluoroethylamine.

The bonding composition includes a light-absorbing electron donor. The light-absorbing electron donor may be an aromatic amine, an aliphatic amine, an aromatic phosphine, an aromatic thioether, a thiophenol, a thiolate, or combinations thereof. The aromatic amine may be an aniline, such as an N,N-dialkylaniline, an N-alkylaniline, or aniline. The light-absorbing electron donor may have a fluorinated moiety, such as a fluoroalkyl group. The light-absorbing electron donor may be polymerizable. The thiolate can be a salt of a mercapto-containing compound.

The bonding composition may further include an aliphatic or aromatic amine, such as a mono-, di-, or tri-substituted amine, such as an alkylamine, an arylamine, an alkenylamine, or an amino-substituted organosilane, such as an amino-substituted organosilane having a hydrolyzable substituent. In certain embodiments, the bonding composition may include an onium salt. The fluoropolymer may be a perfluorinated polymer, such as a fluorinated ethylene and propylene polymer. The substrate may include an inorganic substrate, such as a metal or a glass, or an organic substrate, such as a non-fluorinated polymer.

The light-absorbing electron donor may reduce the fluoropolymer, for example at a C—F bond, to facilitate bonding. The bonding process may be a photoinduced electron transfer process.

Bonded multi-layer materials may have combined physical and chemical properties possessed by both fluoropolymers and non-fluorinated polymers, resulting in less expensive, well performing articles. For example, the fluoropolymer component may be used in automotive hose and container constructions, anti-soiling films, low energy surface PSA tapes and coatings for aircraft. The bonding process is a mild photochemical lamination that may promote adhesion between a fluoropolymer and a substrate. The bonding composition may be used to form a composite article having a fluoropolymer cladding on a conductive and lustrous metal to protect it from corrosion, a fluoropolymer cladding on glass fibers to enhance their physical strength and chemical resistance for telecommunication, or a fluoropolymer layer bonded to a hydrocarbon substrate in a multi-layer materials. The ability to affect bonding with actinic radiation may permit photo-imaging/photolithography on perfluoropolymers.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a cross-sectional view of a multi-layer article.

DETAILED DESCRIPTION

A fluoropolymer layer may be bonded on one surface of a substrate to form, for example, a laminate. The laminate may contain two or more layers. Referring to FIG. 1, the laminate 10 includes fluoropolymer layer 20 and the substrate 30. Bonding composition 40 contacts the interface between fluoropolymer layer 20 and substrate 30. Actinic radiation applied to the bonding composition promotes bonding between fluoropolymer layer 20 and substrate 30.

The bonding composition includes a light-absorbing electron donor. The bonding composition may include a solvent to facilitate applying a coating of the composition to a surface of the fluoropolymers or the substrate, or both. The solvent may be removed, for example, by drying, prior to contacting the substrate and fluoropolymers surfaces. Any solvent, if used may be a fluorinated solvent, for example, a fluorinated solvent having at least one fluorinated moiety. Fluorinated solvents may be effective at promoting wetting of the bonding composition onto either substrate. Preferred highly fluorinated solvents include, for example, hexafluoroxylene, hexafluorobenzene, and the like.

Actinic radiation is electromagnetic radiation having a wavelength capable of affecting bonding between the fluoropolymer and the substrate in the presence of the bonding composition. The actinic radiation has an intensity at the wavelength capable of affecting bonding within a reasonable amount of time. The actinic radiation may have a wavelength between 190 nm and 700 nm, preferably between 200 nm and 400 nm, more preferably between 205 nm and 320 nm, even more preferably between 210 nm and 290 nm, and even more preferably between 240 nm and 260 nm.

The actinic radiation has a wavelength that is absorbed by the light-absorbing electron donor. The light-absorbing electron donor may have an absorbing moiety capable of being excited by the actinic radiation, such as, for example, a benzyl moiety or other aromatic moiety. The light-absorbing electron donor, when excited by the actinic radiation, is capable of reducing the fluoropolymer. The light-absorbing electron donor may be an aromatic amine, an aromatic phosphine, an aromatic thioether, or combinations thereof. For example, the light-absorbing electron donor may be an aniline, such as an N,N-dialkylaniline, an N-alkylaniline, a fluorinated aniline or aniline. In certain embodiments, the light-absorbing electron donor may be polymerizable, such as a 4-vinylaniline, tertiary amino acrylates (e.g., dimethylaminoethyl acrylate), and the like. The light-absorbing electron donor may have a molar absorptivity of at least 100, preferably at least 500, more preferably at least 1,500, even more preferably at least 5,000 at a wavelength when exposed to actinic radiation. In some embodiments, the light-absorbing electron donor may include individual components that do not significantly absorb actinic radiation in a purified state, but absorbs light when the components are combined. For example, a component of the composite may form a charge-transfer complex with the fluoropolymer, substrate or other added ingredient, resulting in a donor that absorbs actinic radiation.

The bonding composition may include an onium salt. The onium salt may be an ammonium salt, a phosphonium salt, a sulfonium salt, a sulfoxonium salt, an iodonium salt, or combinations thereof. Specific examples include tetraalkylammonium salts, such as benzyltributylammonium chloride, tetraalkylphosphonium salts, such as benzyltriphenylphosphonium chloride, and triarylsulfonium chloride. Other examples of onium salts are described, e.g., in Fukushi, U.S. Pat. No. 5,658,671, "Fluoroelastomer Coating Composition," hereby incorporated by reference.

The bonding composition may optionally include an amine, a phosphine, a thiol, a thioether, or combinations thereof. The amine may be a primary amine, such as an alkylamine, e.g., a monoalkylamine. The amine may be an alkenylamine. The amine may be an amino-substituted organosilane. The amino-substituted organosilane may have a hydrolyzable substituent, for example, it may be a trialkoxysilane. For example, the amino-substituted organosilane may have the formula:

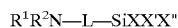

where each of $R^1$ and $R^2$, independently, is H, C1–12 alkyl, C1–12 alkenyl, C1–12 alkynyl, or aryl, and L is a divalent straight chain C1–12 alkylene, C3–8 cycloalkylene, 3–8 membered ring heterocycloalkylene, C1–12 alkenylene, C3–8 cycloalkenylene, 3–8 membered ring heterocycloalkenylene, arylene, or heteroarylene. L is optionally substituted with C1–4 alkyl, C2–4 alkenyl, C2–4 alkynyl, C1–4 alkoxy, hydroxyl, halo, carboxyl, amino, nitro, cyano, C3–6 cycloalkyl, 3–6 membered heterocycloalkyl, monocyclic aryl, 5–6 membered ring heteroaryl, C1–4 alkylcarbonyloxy, C1–4 alkyloxycarbonyl, C1–4 alkylcarbonyl, formyl, C1–4 alkylcarbonylamino, or C1–4 aminocarbonyl. L is further optionally interrupted by —O—, —S—, —N(Rc)—, —N(Rc)—C(O)—, —N(Rc)—C(O)—O—, —O—C(O)—N(Rc)—, —N(Rc)—C(O)—N(Rd)—, —O—C(O)—, —C(O)—O—, or —O—C(O)—O—. Each of Rc and Rd, independently, is hydrogen, alkyl, alkenyl, alkynyl, alkoxy, hydroxylalkyl, hydroxyl, or haloalkyl; and each of X, X' and X" is a C1–18 alkyl, halogen, C1–8 alkoxy, C1–8 alkylcarbonyloxy, or amino group. When the amino-substituted organosilane has a hydrolyzable substituent, at least one of X, X', and X" is not alkyl. Further, any two of X, X' and X" may be joined through a covalent bond. The amino group may be an alkylamino group.

The bonding composition may include other additives, for example, a vinylsilane, such as an alkoxyvinylsilane, polyhydroxy aromatic compounds, or a thermosetting resin such as an epoxy resin, a urethane resin, a urea resin, or an acrylate resin.

The fluoropolymer may be a perfluorinated polymer. For example, the fluoropolymer may be either melt-processible such as in the case of a terpolymer of tetrafluoroethylene, hexafluoropropylene and vinylidene fluoride (THV™), a tetrafluoroethylene-hexafluoropropene copolymer (FEP), and other melt-processible fluoroplastics, or may be non-melt processable such as in the case of polytetrafluoroethylene (PTFE), modified PTFE copolymers, such as a copolymer of TFE and low levels of fluorinated vinyl ethers and fluoroelastomers. Fluoroelastomers may be processed before they are cured by injection or compression molding or other methods normally associated with thermoplastics. Fluoroelastomers after curing or crosslinking may not be able to be further processed. Fluoroelastomers may also be coated out of solvent in their uncross linked form. Fluoropolymers may also be coated from an aqueous dispersion form. In preferred embodiments, the fluoropolymer may be FEP, a tetrafluoroethylene-perfluoropropyl vinyl ether copolymer (PFA), perfluoroelastomer, or mixtures thereof.

Preferably, the fluoropolymer is a material that is capable of being extruded or coated. Such fluoropolymers typically are fluoroplastics that have melting temperatures ranging from about 100 to about 330° C., more preferably from about 150 to about 270° C. Preferred fluoroplastics include interpolymerized units derived from VDF and fluoroethylene and may further include interpolymerized units derived from other fluorine-containing monomers, non-fluorine-containing monomers, or a combination thereof.

Examples of suitable fluorine-containing monomers include tetrafluoroethylene (TFE), hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$), and fluorine-containing di-olefins such as perfluorodiallylether and perfluoro-1,3-butadiene.

The VDF-containing fluoropolymers may be prepared using emulsion polymerization techniques as described, e.g., in Sulzbach et al., U.S. Pat. No. 4,338,237 or Grootaert, U.S. Pat. No. 5,285,002, hereby incorporated by reference. Useful commercially available VDF-containing fluoropolymers include, for example, THV™ 200, THV™ 400, THV™ 500G, THV™ 610X fluoropolymers (available from Dyneon LLC, St. Paul, Minn.), KYNAR™ 740 fluoropolymer (available from Atochem North America, Philadelphia, Pa.), HYLAR™ 700 (available from Ausimont USA, Inc., Morristown, N.J.), and FLUOREL™ FC-2178 (available from Dyneon, LLC).

A particularly useful fluoropolymer includes interpolymerized units derived from at least TFE and VDF in which the amount of VDF is at least 0.1% by weight, but less than 20% by weight. Preferably, the amount of VDF ranges from 3–15% by weight, more preferably from 10–15% by weight.

Examples of suitable fluoroelastomers include VDF-HFP copolymers, VDF-HFP-TFE terpolymers, TFE-propylene copolymers, and the like.

Perfluorinated copolymer TEFLON™ FEP™ combines most of the desirable properties of PTFE with a melt viscosity low enough for conventional melt processing. FEP resins are random copolymers of TFE with HFP. The comonomer content in FEP may be from 10 to 15 wt %, or 25 and 50 wt %, which designated as SF-25 and SF-50. Compositions and properties of various perfluorinated polymers are summarized in Table

TABLE 1

| | $---(CF_2-CF_2)_x-(CF_2-CFCF_3)_y---$ | |
|---|---|---|
| Polymer | HFP/TFE (wt %/wt %) | Melting Temperature (° C.) |
| PTFE | 0/100 | 327 |
| FEP | 15/85 | 260 |
| SF-25 | 25/75 | 180 |
| SF-50 | 50/50 | 50 |

Perfluoropolymers, such as those listed in Table 1, have outstanding electrical properties, chemical resistance, and low surface energy. Specifically, they are excellent insulators with high dielectric strengths and a dielectric constant that does not change significantly over wide temperature or frequency ranges. The low moisture absorption of the perfluoropolymers may result in electrical properties which are little affected by humidity. The perfluoropolymers are inert to nearly all chemicals and solvents, even at elevated temperature and pressures, reacting only with strong reducing agents such as molten alkali metals. With the exception of perfluorinated liquids, few chemicals are absorbed into or swell perfluoropolymers, and their high crystallinity leads to relative low gas permeability. As a result, they act as excellent barrier resins. Their low surface energy and coefficients of friction against other materials lead to the well-known anti-stick applications.

The substrate may include an inorganic substrate, such as a metal or an inorganic glass, or an organic substrate, such as a fluoropolymer or a non-fluorinated polymer. The metal may be copper or stainless steel. The inorganic glass may be a silicate. The non-fluorinated polymer may be a polyamide, a polyolefin, a polyurethane, a polyester, a polyimide, a polyimide, a polystyrene, a polycarbonate, a polyketone, a polyurea, a polyacrylate, and a polymethyl methacrylate, or a mixture thereof. For example, the non-fluorinated polymer may be a non-fluorinated elastomer, such as acrylonitrile-butadiene rubber (NBR), butadiene rubber, chlorinated and chlorosulfonated polyethylene, chloroprene rubber, ethylene-propylene monomer (EPM) rubber, ethylene-propylene-diene monomer (EPDM) rubber, epichlorohydrin (ECO) rubber, polyisobutylene rubber, polyisoprene rubber, polysulfide rubber, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers include ELVAX™ available from E.I DuPont de Nemours Co., Wilmington, Del.

Polyamides useful as the non-fluorinated polymer are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 may be used, as well as ring-containing polyamides such as nylon-6, T and nylon-6,1. Suitable nylons include VESTAMID™ L2140, a nylon-12 available from Creanova, Inc. of Somerset, N.J. Polyether-containing polyamides, such as PEBAX™ polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, poly-caprolactone diol, poly-1,2-butylene oxide glycol, and combinations thereof. Chain extenders such as butanediol or hexanediol may also be used in the reaction. Useful commercially available urethane polymers include MORTHANE™ L424.167 (MI=9.7), PN-04 or 3429 from Morton International of Seabrook, NH and X-4107 from B.F. Goodrich Co., of Cleveland, Ohio.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers may be prepared by conventional free radical polymerization or catalysis of such ethylenically unsaturated monomers. The degree of crystallinity of the polymer may vary. The polymer may, for example, be a semi-crystalline high density polyethylene or may be an elastomeric copolymer of ethylene and propylene. Carboxyl, anhydride, or imide functionalities may be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available, for example, as ENGAGE™ (Dow-DuPont Elastomers, Wilmington, Del.) or EXACT™ (ExxonMobil, Linden, N.J.). For example, anhydride modified polyethylene polymers are commercially available from E.I. DuPont de Nemours & Co., Wilmington, Del., under the trade designation BYNEL™ co-extrudable adhesive resins.

Useful polyacrylates and polymethacrylates include polymers of acrylic acid, methyl acrylate, ethyl acrylate, acrylamide, methacrylic acid, methyl methacrylate, ethyl methacrylate, and the like. An example of a polymethacrylate is EMAC™ (Chevron Chemical Co., Houston, Tex.).

Useful polycarbonate polymers include aliphatic polycarbonates such as polyestercarbonates, polyethercarbonates, and bisphenol A derived polycarbonates, and the like.

Useful polyimide polymers include polyimide polymers made from the anhydride of pyromellitic acid and 4,4'-diaminodiphenyl ether available from E.I. DuPont de Nemours and Company under the tradename KAPTON™. Variations include KAPTON™ H, KAPTON™ E and KAPTON™ V, among others.

Additional examples of useful non-fluorinated polymers, as noted above, include polyesters, polycarbonates, polyketones, and polyureas. Commercially available examples of such polymers include SELAR™ polyester (E.I. DuPont de Nemours & Co., Wilmington, Del.), LEXAN™ polycarbonate (General Electric, Pittsfield, Mass.), KADEL™ polyketone (Amoco, Chicago, Ill.), and SPECTRIM™ polyurea (Dow Chemical Co., Midland, Mich.).

Commercially available elastomers include NIPOL™ 1052 NBR (Zeon Chemical, Louisville, Ky.), HYDRIN™ C2000 epichlorohydrin-ethylene oxide rubber (Zeon Chemical, Louisville, Ky.), HYPALON™ 48 chlorosulfonated polyethylene rubber (E.I. DuPont de Nemours & Co., Wilmington, Del.), NORDEL™ EPDM (R.T. Vanderbilt Co., Inc., Norwalk Conn.), VAMAC™ ethylene-acrylate elastomer (E.I. DuPont de Nemours & Co. Wilmington, Del.), KRYNAC™ NBR (Bayer Corp., Pittsburgh, Pa.), PERBUNAN™ NBR/PVC blend (Bayer Corp., Pittsburgh, Pa.), THERBAN™ Hydrogenated NBR (Bayer Corp., Pittsburgh, Pa.), ZETPOL™ hydrogenated NBR (Zeon Chemical, Louisville, Ky.), SANTOPRENE™ thermoplastic elastomer (Advanced Elastomer Systems, Akron, Ohio), and KELTAN™ EPDM (DSM Elastomers Americas, Addis, La.).

The substrate may include a second fluoropolymer.

The substrate may have one or more surface polar functionality present thereon to enhance bonding, such as, for example, an amino, carboxyl and hydroxyl functionality.

The bonding composition may be deposited on a surface of the fluoropolymer, the substrate or both. In certain embodiments, the bonding composition may be incorporated into the fluoropolymer, the substrate, or both, such that when the surfaces contact each other, the bonding composition contacts the fluoropolymer and the substrate simultaneously. The bonding composition may be incorporated into the fluoropolymer or the substrate by melt-mixing or extruding a mixture including the bonding composition. Alternatively, the bonding composition may be applied to a surface of the fluoropolymer or substrate by an process such as, for example, spray coating, curtain coating, immersion coating, dip coating, flood coating, and the like.

The fluoropolymer and substrate may contact each other under pressure, with optional heating, to form a precursor that is subsequently exposed to actinic radiation. In certain situations, more than one fluoropolymer layer may contact more than one surface of the substrate. In still other situations, two substrates may contact two surfaces of a fluoropolymer.

Each of the fluoropolymer and the substrate, independently, may be provided as a film or as a molded or shaped article. Preferably either the fluoropolymer or the substrate is substantially transmissive to the actinic radiation.

The fluoropolymer is bonded to the substrate by exposing the bonding composition to actinic radiation. The bonding composition may be exposed to actinic radiation through the fluoropolymer, through the substrate, or both. In certain situations, the exposure to actinic radiation may be before the substrate contacts the fluoropolymer. In other situations, the exposure to actinic radiation may occur after the substrate and fluoropolymer contact each other. In still other situations, exposure to actinic radiation occurs simultaneously upon contacting the substrate and the fluoropolymer. Heat, and optionally pressure or heat and pressure, may be applied after the actinic radiation to further improve the bonding.

Suitable sources of actinic radiation include arc lamps, such as xenon-arc lamps, mercury arc lamps (including low and medium pressure mercury arc lamps), fluorescent blacklights, microwave-driven lamps, such as those sold by Fusion UV Systems of Rockville, Md. (including H-type and D-type bulbs), lasers and the like. Lamps that emit enriched amounts of ultraviolet or blue light, such as, for example, low pressure mercury (e.g., germicidal) lamps, are preferred.

The bonding composition may be applied as a solution, for example, a methanol solution, containing 3–10 wt % of a light-absorbing electron donor, such as N,N-dimethylaniline. Photolysis of a laminate containing this bonding composition at 254 nm for 5–10 minutes produces bonding of a substrate to FEP film, which may be enhanced by further heat-treatment by pressing at a temperature between 150 and 200° C. Alternatively, an aliphatic amine combined with a catalytic amount of an aromatic amine, for example, 0.1 to 1 wt %, may serve as the bonding composition, particularly for polyamide substrates and inorganic substrates.

In many cases, heat, pressure, or combinations thereof, may be desired during bonding. Suitable heat sources include, but are not limited to, ovens, heated rollers, heated presses, infrared radiation sources, flame, and the like. Suitable pressure sources are well known and include presses, nip rollers, and the like.

The invention will now be described further by way of the following examples.

EXAMPLES

In the following examples, the term "wt %" means weight percent based on total weight.

"Dyneon™ THV™ 500" refers to a terpolymer of TFE/HFP/VDF, having a melt temperature of 165° C.; "Dyneon™ THV™ 400" refers to a terpolymer of TFE/HFP/VDF, having a melt temperature of 150° C.; "Dyneon™ THV™ 200" refers to a terpolymer of TFE/HFP/VDF, having a melt temperature of 120° C.; "HTE" refers to a terpolymer of hexafluoropropylene, teterafluoroethylene and ethylene all available from Dyneon, L.L.C. of Oakdale, Minn.

"PVDF-HV" refers to "PVDF 11010" which is a tradename for a copolymer of hexafluoropropylene and vinylidene fluoride having a melting point of 160° C.; "PVDF-CV" refers to SOLEF™ PVDF-CV which is a copolymer of chlorotrifluoroethylene and vinylidene fluoride, both commercially available from Soltex Polymer Corp. of Houston, Tex.

"BYNEL™ 3101" is an acid modified ethylene-vinyl acetate copolymer; "polyimide" refers to "KAPTON™ 100HN" film, all commercially available from E.I. Du Pont de Nemours of Wilmington Del.

"EMAC™ 2202T" is a copolymer of ethylene and methyl acrylate, 80/20 by weight available from Chevron Chemical Co. of Houston, Tex.

"MORTHANE™ L424.167 (MI=9.7)" is an aliphatic polyurethane available from Morton, International of Chicago, Ill.

"VESTAMID™ L2140" refers to nylon 12 having a Vicat softening point of 140° C. commercially available from Creanova, Inc. of Somerset, N.J.

Unless otherwise specified, additional materials used in the examples were readily available from general commercial vendors such Sigma-Aldrich Chemical Co. of Milwaukee, Wis.

Example 1

Polymer films were prepared by placing polymer granules indicated in Table 1 were placed between two sheets of polytetrafluoroethylene having thicknesses of 0.38 mm and softening them for 2–3 minutes at 200° C. Subsequently, the softened materials were pressed for about 5 to 10 seconds between two heated platens of a Wabash hydraulic press (Wabash Metal Products Company, Inc., Hydraulic Division, Wabash, Ind.) with sufficient pressure to achieve a film thickness of 0.51 mm and immediately transferred to a cold Wabash hydraulic press at 13–15° C. and 2–4 psi (14–28 kPa). After cooling to room temperature in the cold press, round-shaped films of polymer having a thickness of 1.5 mm were obtained. Small pieces of the pressed films were then placed between two stainless steel plates lined with polyethylene terephthalate-silicone coated release liners and pressed for 2–3 minutes at 200° C. with pressure and applied between two heated platens of a Wabash hydraulic press. The films produced in this manner were then smooth films of 0.08 to 0.15 mm in thickness. The substrate films thus prepared were cut to dimensions of approximately 2.5 cm by 5 cm for use in lamination.

Bonding compositions were prepared using chemicals available from Aldrich Chemical Co.

Samples having dimensions of approximately 1 inch (2.5 cm) by 2 inches (5.1 cm) were cut from the thin films. The substrate was coated with the bonding composition. It was not necessary to dry the bonding composition before forming the bond. Samples were prepared by contacting a fluoropolymer film surface with the bonding composition-coated substrate surface to form a laminate precursor. Comparative experiments were run using only methanol as a bonding composition. The laminate precursor was then placed vertically in the center of a 254 nm photoreactor (Rayonet chamber reactor, model RPR-100 equipped with sixteen low pressure mercury bulbs available from The Southern New England Ultraviolet, Inc. of New Haven, Conn. These samples were irradiated for periods of time indicated in Tables 2–26. After irradiation, the irradiated samples were subjected to hot lamination onto thicker films (1–1.5 mm) of their respective materials for 2 minutes at 200° C. in order to obtain accurate adhesion measurement because the irradiated samples were too thin and film stretching/rupturing would be expected during the measurement.

Peel strength was used to determine the degree of bonding. Peel strength was determined in accordance with ASTM D-1876 (T-peel test) using a SinTech tensile tester (available from MTS Corp., Eden Prairie, Minn.), set at a 4 inch (10.2 cm) per minute crosshead speed was used as the test device. The peel strength was calculated as the average load measured during the peel test.

The measured peel strength is shown in Tables 2–27. Comparative experiments showed that no adhesion between primed substrate and fluoropolymer films was observed prior to irradiation.

Example 2

Glass microscope slides and stainless steel panels (1 inch (2.5 cm) by 2 inch (5.1 cm) pieces) were cleaned with acetone. A surface of the glass or steel substrate was flood coated with a primer, and a piece of fluoropolymer film was subsequently laminated onto the coated substrate in a good surface contact. A strip of silicone liner was inserted along the short edge between the substrate surface and the fluoropolymer film to provide tabs for the peel test. The laminated sample was positioned vertically in the center of a 254 nm photoreactor as described above and irradiated for a period of time as shown in Table 4. The measured peel strength is shown in Table 4.

Example 3

An FEP film having a thickness of 0.25 mm was exposed to 254 nm irradiation in the photoreactor as described above for 60 minutes in a 10 weight percent N,N,N',N'-tetramethylphenylenediamine in N,N-dimethylformamide (DMF) in a quartz flask. Subsequently, the film was taken out and then it was laminated on a piece of VESTAMID™ L2140 nylon sheet having a thickness of 0.51 mm. The laminated layers were subjected to a hot-press at 200° C. for 2 minutes at 2–3 psi (14–21 kPa). No adhesion was observed between the layers.

In a comparative experiment, an FEP film was exposed to 254 nm irradiation in a photoreactor as described above for 60 minutes in a 10 wt % N,N,N',N'-tetramethylphenylenediamine in DMF in a quartz flask. Subsequently, the film was taken out and then it was laminated on a piece of nylon-12 sheet. The laminated layers were subjected to a hot-press at 200° C. for 2 minutes at 2–3 psi (14–21 kPa). No adhesion was observed between the layers. A second comparative experiment employing 10 wt % N,N,N',N'-tetramethylphenylenediamine in methanol as a solvent also showed no bonding between the layers.

Example 4

Catalytic effect on fluoropolymer bonding in the presence of allylamine was demonstrated by forming two laminates. First, when a bonding composition of 0.9 wt % N,N-dimethylaniline in acetonitrile was flood coated between FEP and VESTAMID™ L2140 nylon, irradiated at 254 nm in a photoreactor as described above for 5 minutes, and pressed at 200° C. for 2 minutes at 2–3 psi to form a laminate, the laminate had a peel strength of 1.8 N/cm. Second, when a bonding composition of 0.9 wt % N,N-dimethylaniline and 10 wt % allylamine in acetonitrile was applied between FEP and VESTAMID™ L2140 nylon, irradiated at 254 nm for 5 minutes, and pressed at 200° C. for 2 minutes at 2–3 psi (14–21 kPa) to form a laminate, the laminate had a peel strength of >22.8 N/cm.

TABLE 2

Bonding composition: 10 wt % N,N-dimethylaniline in methanol

| Sample | Irradiation Time (min) | Press Time at 180–200° C. (min) | Peel Strength (N/cm) |
|---|---|---|---|
| FEP/BYNEL ™ 3101 | 25 | 2 | 21.3 |
| FEP/ELVAX ™ 450 | 25 | 2 | 15.1 |
| FEP/EMAC ™ 220T | 25 | 2 | 14.2 |
| FEP/MORTHANE ™ L424.167 (MI = 9.7) | 25 | 2 | 11.2 |
| FEP/VESTAMID ™ L2140 | 25 | 2 | 16.9 |
| FEP/EXACT ™ 4015 | 10 | 2 | 3.9 |

TABLE 3

Binding composition: 10 wt % allylamine combined with a catalytic amount of N,N-dimethylaniline (0.9 wt %) in methanol

| Sample | Irradiation Time (min) | Press Time at 180–200° C. (min) | Peel Strength (N/cm) |
|---|---|---|---|
| FEP/BYNEL ™ 3101 | 25 | 2 | 32.2 |
| FEP/ELVAX ™ 450 | 25 | 2 | 20.3 (slips) |
| FEP/EMAC ™ 2202T | 25 | 2 | 18.5 |
| FEP/MORTHANE ™ L424.167 (MI = 9.7) | 25 | 2 | 19.9 |
| FEP/VESTAMID ™ L2140 | 25 | 2 | 15.5 |

TABLE 4

Bonding composition: 10 wt % 3-aminopropyltriethoxysilane combined with a catalytic amount of N,N-dimethylaniline (0.9 wt %) in methanol

| Sample | Irradiation Time (minutes) | Press Time at 180–200° C. (min) | Peel Strength (N/cm) |
|---|---|---|---|
| FEP/Quartz glass | 15 | 2 | Polymer film failed before peel |
| FEP/Stainless Steel | 15 | 2 | Polymer film failed before peel |
| FEP/Polyimide | 20 | 2 | Polymer film failed before peel |

TABLE 5

Bonding composition: 10 wt % 4-vinylaniline in methanol

| Sample | Irradiation Time (min) | Press time at 180–200° C. (min) | Peel Strength (N/cm) |
|---|---|---|---|
| FEP/BYNEL ™ 3101 | 20 | 2 | 17.6 |

TABLE 6

Comparative (No bonding composition)

| Sample | Irradiation Time (min) | Press Time at 180–200° C. (min) | Peel Strength (N/cm) |
|---|---|---|---|
| FEP/BYNEL ™ 3101 | 30 | 2 | 0 |
| FEP/VESTAMID ™ L2140 | 30 | 2 | 0 |

TABLE 7

Bonding composition: N,N,N',N'-Tetramethylphenylenediamine 10 wt % in methanol

| Sample | Irradiation time at 365 nm (min) | Press Time at 200° C. (min) | Peel strength (N/cm) | Irradiation time at 254 nm (min) | Press Time at 200° C. (min) | Peel strength (N/cm) |
|---|---|---|---|---|---|---|
| FEP/VESTAMID ™ L2140 | 2 | 2 | 0 | 2 | 2 | 11.8 |
| FEP/BYNEL ™ 3101 | 2 | 2 | 0 | 2 | 2 | <1.7 |
| FEP/VESTAMID ™ L2140 | 5 | 2 | 0 | 5 | 5 | >23.3 |
| FEP/BYNEL ™ 3101 | 5 | 2 | 0 | 5 | 5 | 15.8 |
| FEP/VESTAMID ™ L2140 | 10 | 2 | 0 | 10 | 2 | Polymer film failed before peel |
| FEP/BYNEL ™ 3101 | 10 | 2 | 0 | 10 | 2 | Polymer film failed before peel |
| FEP/VESTAMID ™ L2140 | 20 | 2 | <1.7 | 20 | 2 | Polymer film failed before peel |
| FEP/BYNEL ™ 3101 | 20 | 2 | 0 | 20 | 2 | Polymer film failed before peel |

TABLE 8

Bonding composition: N,N-Dimethylaniline 5 wt % in methanol

| Sample | Irradiation time at 254 nm (min) | Press Time at 200° C. (min) | Peel strength (N/cm) |
|---|---|---|---|
| FEP/HTE | 30 | 2 | 19.3 |
| FEP/THV 500 | 10 | 2 | 17.3 |
| PFA/THV500 | 10 | 2 | 21.2 |
| PFA/THV200 | 10 | 2 | 16.8 |
| THV400/PVDF | 10 | 2 | 7.0 |
| FEP/VESTAMID ™ L2140 | 2 | 2 | 17.5 |
| FEP/BYNEL ™ 3101 | 5 | 2 | >12.3 |
| FEP/MORTHANE ™ L424.167 (MI = 9.7) | 5 | 2 | 8.8 |
| PFA/BYNEL ™ 3101 | 25 | 2 | 19.5 |
| PFA/EMAC ™ 2220 | 25 | 2 | 19.7 |
| PFA/VESTAMID ™ L2140 | 25 | 2 | 10.9 |
| PFA/MORTHANE ™ L424.167 (MI = 9.7) | 25 | 2 | 10.0 |

TABLE 9

Comparative Examples
No bonding composition

| Sample | Press Time at 200° C. (min) | Peel strength (N/cm) |
|---|---|---|
| FEP/HTE | 2 | 0 |
| FEP/THV 500 | 2 | 0 |
| PFA/THV500 | 2 | 0 |
| PFA/THV200 | 2 | 0 |
| PFA/EFEP | 2 | 0 |
| THV400/PVDF | 2 | 0 |

TABLE 10

Bonding composition: m-Methoxy-N,N-dimethylaniline 10 wt % in methanol

| Sample | Irradiation Time at 254 nm (min) | Press Time at 200° C. (min) | Peel strength (N/cm) |
|---|---|---|---|
| FEP/VESTAMID ™ L2140 | 5 | 2 | >23.3 |
| FEP/BYNEL ™ 3101 | 5 | 2 | >14.0 |

TABLE 11

Bonding composition: N,N,2,4,6-pentamethylaniline 10 wt % in methanol

| Sample | Irradiation time at 254 nm (min) | Press Time at 200° C. (min) | Peel Strength (N/cm) |
|---|---|---|---|
| FEP/VESTAMID ™ L2140 | 5 | 2 | >19.3 |
| FEP/BYNEL ™ 3101 | 5 | 2 | 3.5 |

TABLE 12

Bonding composition: N,N,N',N-Tetramethylethylenediamine 10 wt % in acetonitrile

| Sample | Irradiation time at 254 nm (min) | Press time at 200° C. (min) | Peel strength (N/cm) |
|---|---|---|---|
| FEP/VESTAMID ™ L2140 | 5 | 2 | >15.8 |
| FEP/BYNEL ™ 3101 | 5 | 2 | >15.8 |

TABLE 13

Bonding composition: N,N'-Dimethyl piperazine 10 wt % in acetonitrileacetonitrile

| Sample | Irradiation Time at 254 nm (min) | Press Time at 200° C. (min) | Peel Strength (N/cm) |
|---|---|---|---|
| FEP/VESTAMID ™ L2140 | 5 | 2 | >19.3 |
| FEP/BYNEL ™ 3101 | 5 | 2 | 8.2 |

TABLE 14

Bonding composition: N,N'-Dimethyl-1,3-propanediamine 10 wt % in acetonitrile

| Sample | Irradiation Time at 254 nm (min) | Press Time at 200° C. (min) | Peel Strength (N/cm) |
|---|---|---|---|
| FEP/VESTAMID ™ L2140 | 5 | 2 | 30.3 |
| FEP/BYNEL ™ 3101 | 5 | 2 | 8.9 |

TABLE 15

Bonding composition: Triethylene tetraamine 10 wt % in methanol

| Sample | Irradiation time at 254 nm (min) | Press time at 200° C. (min) | Peel strength (N/cm) |
|---|---|---|---|
| FEP/VESTAMID ™ L2140 | 5 | 2 | >19.3 |
| FEP/BYNEL ™ 3101 | 5 | 2 | >17.4 |

TABLE 16

Bonding composition: N-Phenylaminopropyltriethoxylsilane 10 wt % in acetonitrile

| Sample | Irradiation Time at 254 nm (min) | Press Time at 200° C. (min) | Peel Strength (N/cm) |
|---|---|---|---|
| FEP/VESTAMID ™ L2140 | 5 | 2 | >31.6 |
| FEP/BYNEL ™ 3101 | 5 | 2 | >12.1 |

TABLE 17

Bonding composition: Diethylamine 10 wt % in acetonitrile

| Sample | Irradiation Time at 254 nm (min) | Press Time at 200° C. (min) | Peel Strength (N/cm) |
|---|---|---|---|
| FEP/VESTAMID ™ L2140 | 5 | 2 | >14.6 |
| FEP/BYNEL ™ 3101 | 5 | 2 | >12.3 |

TABLE 18

Bonding composition: Polyethyleneimine 10 wt % in acetonitrile

| Sample | Irradiation time at 254 nm (min) | Press time at 200° C. (min) | Peel strength (N/cm) |
|---|---|---|---|
| FEP/VESTAMID ™ L2140 | 5 | 2 | 11.0 |
| FEP/BYNEL ™ 3101 | 5 | 2 | 12.3 |

TABLE 19

Bonding composition: Polyethyleneimine 10 wt % in water

| Sample | Irradiation time at 254 nm (min) | Press time at 200° C. (min) | Peel strength (N/cm) |
|---|---|---|---|
| FEP/VESTAMID ™ L2140 | 5 | 2 | 6.1 |
| FEP/BYNEL ™ 3101 | 5 | 2 | >8.8 |

TABLE 20

Bonding composition: $NaSCH_2CH_2CH_2ONa$ 10 wt % in methanol

| Sample | Irradiation time at 254 nm (min) | Press time at 200° C. (min) | Peel strength (N/cm) |
|---|---|---|---|
| FEP/VESTAMID ™ L2140 | 5 | 2 | 7.9 |
| FEP/BYNEL ™ 3101 | 5 | 2 | 5.3 |

TABLE 21

Bonding composition: 3-Mercaptopropyltrimethoxysilane sodium salt 10 wt % in acetonitrile

| Sample | Irradiation Time at 254 nm (min) | Press Time at 200° C. (min) | Peel strength (N/cm) |
|---|---|---|---|
| FEP/VESTAMID ™ L2140 | 5 | 2 | 8.8 |
| FEP/BYNEL ™ 3101 | 5 | 2 | 2.6 |

TABLE 22

Bonding composition: 1,2-Bis(trimethylsilyloxy)cyclobutene 10 wt % and 3-aminopropyltriethoxysilane 10 wt % in methanol

| Sample | Irradiation Time at 254 nm (min) | Press Time at 200° C. (min) | Peel strength (N/cm) |
|---|---|---|---|
| FEP/VESTAMID ™ L2140 | 5 | 2 | >15.8 |
| FEP/BYNEL ™ 3101 | 5 | 2 | >19.0 |

TABLE 23

Bonding composition: p-Aminostyrene 10 wt % in methanol

| Sample | Irradiation time at 254 nm (min) | Press time at 200° C. (min) | Peel strength (N/cm) |
|---|---|---|---|
| FEP/VESTAMID ™ L2140 | 10 | 2 | 14.0 |
| FEP/BYNEL ™ 3101 | 10 | 2 | 7.9 |

TABLE 24

Bonding composition: N,N-Dimethylamino styrene (100%)

| Sample | Irradiation Time at 254 nm (min) | Press Time at 200° C. (min) | Peel Strength (N/cm) |
|---|---|---|---|
| FEP/VESTAMID ™ L2140 | 5 | 2 | >17.6 |
| FEP/BYNEL ™ 3101 | 5 | 2 | >10.5 |

TABLE 25

Bonding composition: Dimethylaminoethyl methylacrylate (100%)

| Sample | Irradiation Time at 254 nm (min) | Press Time at 200° C. (min) | Peel Strength (N/cm) |
|---|---|---|---|
| FEP/VESTAMID ™ L2140 | 5 | 2 | 14.0 |
| FEP/BYNEL ™ 3101 | 5 | 2 | 7.0 |

TABLE 26

Bonding composition: Dibutylaminoethyl acrylate (100%)

| Sample | Irradiation Time at 254 nm (min) | Press Time at 200° C. (min) | Peel Strength (N/cm) |
|---|---|---|---|
| FEP/VESTAMID ™ L2140 | 5 | 2 | 4.4 |
| FEP/BYNEL ™ 3101 | 5 | 2 | >14.0 |

TABLE 27

Bonding composition: Dimethyldithiocarbamic acid sodium salt dihydrate 5 wt % in acetonitrile

| Sample | Irradiation Time at 254 nm (min) | Press Time at 200° C. (min) | Peel Strength (N/cm) |
|---|---|---|---|
| FEP/VESTAMID ™ L2140 | 5 | 2 | Cohesive substrate failure |

Example 5

Fluorinated light-absorbing electron donors were prepared. N-Methyl-N-2,2,2-trifluoroethylaniline was prepared as follows. Into a flask were placed N-methylaniline (6.0 g) and potassium carbonate (10.0 g) the flask was assembled with a refluxing condenser. To the flask was slowly added 2,2,2-trifluoroethyl trifluoromethanesulfonate (13 g). After addition, the reaction mixture was stirred and heated to 100–110° C. overnight. The reaction mixture was then quenched by addition of 100 mL of water. The water solution was extracted with diethyl ether (2×50 mL). The organic layer was separated and dried over $MgSO_4$. Ether was removed under vacuum. The organic liquid was distilled to receive a fraction (a clear yellow liquid, 9.2 g) at 44–45° C. (at 0.05 mm Hg). The clear liquid was sampled and analyzed by $^1H$ and $^{19}F$ NMR. $^1H$ NMR: δ7.28 (t, 2H, J=8 Hz), 6.81 (m, 3H), 3.83 (q, 2H, J=9H), 3.04 (s, 3H); $^{19}F$ NMR: δ–73.37 (t, 3F. J=9 Hz).

N-2,2,2-Trifluoroethylaniline was prepared as follows. Into a flask were placed aniline (2.0 g) and potassium carbonate (1.0 g). The flask was assembled with a reflux condenser. To the flask was slowly added 2,2,2-trifluoroethyl iodide (9.3 g). After addition, the reaction mixture was stirred and heated to 45° C. overnight. The reaction mixture was quenched by addition of 20 mL of water. The mixture was extracted with diethyl ether (2×20 mL). The organic layer was separated and dried over $MgSO_4$. Ether was removed under reduced pressure. The remaining pale yellow oil was sampled and analyzed by $^1H$ and $^{19}F$ NMR. $^1H$ NMR: δ7.15 (t, 2H, J=8 Hz), 6.76 (t, 1H, J=8 (Hz), 6.63(d, 2H, J=8H), 3.62 (b, 1H), 3.52 (q, 2H, J=9 Hz); $^{19}F$ NMR: δ–68.13 (t, 3F, J=9 Hz). 4-(n-Perfluorobutyl)-N,N-dimethylaniline was prepared as follows. A flask was charged with N,N-dimethylaniline (7.0 g), n-perfluorobutyl iodide (20 g), N,N-dimethyl formamide (20 mL) and water (10 mL). To the flask was slowly added a mixture of $NaS_2O_4$ (15.5 g) and $NaHCO_3$ (7.5 g). The reaction started immediately when the mixture of $NaS_2O_4/NaHCO_3$ was introduced, thus the flask was cooled with an ice-water bath. After addition, the mixture was stirred at room temperature overnight. The mixture was poured into 150 mL water. The mixture was then extracted with diethyl ether (4×50 mL). The ether solution was dried over $MgSO_4$. The ether was removed under reduced pressure to reveal a higher boiling point liquid that was distilled to produce a fraction at 61–64 C (at 0.05 mm Hg) (a gold yellow solid, 5.5 g). The solid was sampled and analyzed by $^1H$ and $^{19}F$ NMR. $^1H$ NMR: δ7.33 (d, 2H, J=8 Hz), 6.64 (d, 2H, J=8 Hz), 2.94 (s, 6H); $^{19}F$ NMR: δ–84.5 (3F), –113.0 (2F), –126.5 (2F), –129.2 (2F).

4-(Pentafluoroisopropyl)-N,N-dimethylaniline was prepared as follows. A flask was charged with N,N-dimethylaniline (10.2 g), perfluoroisopropyl iodide (25 g), N,N-dimethyl formamide (35 mL) and water (15 mL). To the flask was slowly added a mixture of $NaS_2O_4$ (17.5 g) and $NaHCO_3$ (8.5 g). The reaction started immediately when the mixture of $NaS_2O_4/NaHCO_3$ was introduced, thus the flask was cooled with an ice-water bath. After addition, the mixture was stirred at room temperature overnight. The mixture was poured into 200 mL water. The mixture was then extracted with diethyl ether (4×50 mL). The ether solution was dried over $MgSO_4$. The ether was removed under reduced pressure to give a crude mixture of ortho- and para-substituted perfluoroisopropyl aniline and a bit of the starting aniline (10.0 g). The higher boiling point liquid was distilled to produce a fraction at 38–45° C. (at 0.05 mm Hg) (a mixture of para- and ortho-substituted products as a yellow liquid, 5.5 g). and a fraction at 45–48° C. (at 0.05 mm Hg) (para-substituted perfluoroisopropyl-N,N-dimethylaniline, 3.8 g). The liquid was sampled and analyzed by $^1H$ and $^{19}F$ NMR. $^1H$ NMR: δ7.35 (d, 2H, J=8 Hz), 6.64 (d, 2H, J=8 Hz), 2.94 (s, 6H); $^{19}F$ NMR: δ–75.3 (6F), –174.2 (F).

4-(Perfluorotetrafurfuryl)-N,N-dimethylaniline was prepared as follows. A flask was charged with N,N-dimethylaniline (10.0 g), perfluorotetrafurfuryl iodide (31 g), N,N-dimethyl formaide (35 mL) and water (20 mL). To the flask was slowly added a mixture of $NaS_2O_4$ (17.5 g) and NaHCO$_3$ (8.5 g). The reaction started immediately when the mixture of NaS$_2$O$_4$/NaHCO$_3$ was introduced, thus the flask was cooled with an ice-water bath. After addition, the mixture was stirred at room temperature overnight. The mixture was poured into 200 mL water. The mixture was then extracted with diethyl ether (4×50 mL). The ether solution was dried over MgSO$_4$. The ether was removed under reduced pressure to give a crude mixture of othro- and para-substituted perfluorotetrafurfuryl aniline and a bit of the starting aniline (14.0 g). The higher boiling point liquid was distilled to receive a fraction at 45–50° C. (at 0.05 mm Hg) (a mixture of para- and ortho-substituted products yellow liquid, 5.5 g), and a fraction at 52–60° C. (at 0.05 mm Hg) (para-substituted product, 6.4 g). The para-substituted product was sampled and analyzed by $^1$H and $^{19}$F NMR. $^1$H NMR: δ7.40 (d, 2H, J=8 Hz), 6.65 (d, 2H, J=8 Hz), 3.0 (s, 6H); $^{19}$F NMR: δ–86.2 (dd 2F), –112.0 (dd, 2F), –124.6 (s, F), –131.7 (dd, 2F), –134.0 (dd, 2F).

Each of N-methyl-N-2,2,2-trifluoroethylaniline, N-2,2,2-trifluoroethylaniline, 4-(n-perfluorobutyl)-N,N-dimethylaniline, 4-(pentafluoroisopropyl)-N,N-dimethylaniline, 4-(perfluorotetrahydrofurfuryl)-N,N-dimethylaniline were used in bonding compositions. The peel strengths are summarized in Tables 28–30.

TABLE 28

| Sample | Irradiation time at 254 nm (min) | Press time at 200° C. (min) | Peel strength (N/cm) |
|---|---|---|---|
| FEP/VESTAMID ™ L2140 with N-methyl-N-2,2,2-trifluoroethylaniline | 5 | 2 | >15.3 |
| FEP/VESTAMID ™ L2140 with N-2,2,2-trifluoroethylaniline | 5 | 2 | 14.9 |
| FEP/VESTAMID ™ L2140 with 4-(n-perfluorobutyl)-N,N-dimethylaniline | 5 | 2 | >19.1 |
| FEP/VESTAMID ™ L2140 with 4-(pentafluoroisopropyl)-N,N-dimethylaniline | 5 | 2 | 17.5 |
| FEP/VESTAMID ™ L2140 with 4-(perfluorotetrafurfuryl)-N,N-dimethylaniline | 5 | 2 | 21.0 |

TABLE 29

Bonding composition: 4-(n-Perfluorobutyl)-N,N-dimethylaniline and N,N-dimethylaniline (1:1 by weight)

| Sample | Irradiation Time at 254 nm (min) | Press Time at 200° C. (min) | Peel Strength (N/cm) |
|---|---|---|---|
| FEP/VESTAMID ™ L2140 | 5 | 2 | 22.8 |
| FEP/BYNEL ™ 3101 | 5 | 2 | 5.1 |

TABLE 30

Bonding composition: 4-(n-Perfluorobutyl)-N,N-dimethylaniline and 3-aminopropyl triethoxy silane (1:1 by weight)

| Sample | Irradiation Time at 254 nm (min) | Press Time at 200° C. (min) | Peel Strength (N/cm) |
|---|---|---|---|
| FEP/VESTAMID ™ L2140 | 5 | 2 | 33.2 |
| FEP/BYNEL ™ 3101 | 5 | 2 | >18.8 |

Example 6

Diethyl 2,2,2-trifluoroethylamine was prepared as follows. Into a flask were placed diethylamine (5.5 g) and potassium carbonate (10.0 g). 2,2,2-Trifluoroethyl-trifluoromethanesulfonate (12 g) was slowly added to the flask. Heat was evolved. After addition, the reaction mixture was stirred at room temperature overnight. Approximately 100 mL of water was added and the organic layer was separated and dried over MgSO$_4$. The organic liquid was distilled to receive a fraction (a clear liquid 7.25 g) at 88–89° C. under normal pressure. The clear liquid was sampled and analyzed by $^1$H and $^{19}$F NMR. $^1$H NMR: δ3.56 (q, 2H, J=9 Hz), 2.65 (q, 2H, J=7 Hz), 1.10 (t, 3H, J=7H); $^{19}$F NMR: δ–68.13 (t, 3F, J=9 Hz).

The diethyl-2,2,2-trifluoroethylamine was used successful as a bonding composition.

Other embodiments are within the scope of the following claims.

What is claimed is:

1. A method of bonding a fluoropolymer to a substrate comprising:
    providing a bonding composition between a fluoropolymer and a substrate, the bonding composition including a light-absorbing electron donor; and
    exposing the bonding composition to actinic radiation, wherein the bonding composition is exposed to actinic radiation through the fluoropolymer, through the substrate, or both.

2. The method of claim 1, wherein the light-absorbing electron donor is selected from the group consisting of an aromatic amine, an aliphatic amine, an aromatic phosphine, an aromatic thioether, a thiophenol, a thiolate, and combinations thereof.

3. The method of claim 1, wherein the light-absorbing electron donor is an aromatic amine.

4. The method of claim 3, wherein the aromatic amine is an aniline.

5. The method of claim 4, wherein the aniline is selected from the group consisting of an N,N-dialkylaniline, an N-alkylaniline, a fluorinated aniline, and aniline.

6. The method of claim 1, wherein the bonding composition includes a primary amine.

7. The method of claim 6, wherein the primary amine is an alkenylamine.

8. The method of claim 1, wherein the bonding composition includes an amino-substituted organosilane.

9. The method of claim 8, wherein the amino-substituted organosilane is an amino-substituted organosilane having a hydrolyzable substituent.

10. The method of claim 1, wherein the bonding composition includes an onium salt.

11. The method of claim 1, wherein the fluoropolymer is a perfluorinated polymer.

12. The method of claim 11, wherein the perfluorinated polymer is a fluorinated ethylene and propylene polymer.

13. The method of claim 1, wherein providing includes treating a surface of the fluoropolymer with the bonding composition and contacting the treated surface of the fluoropolymer with a surface of the substrate.

14. The method of claim 1, wherein providing includes treating a surface of the substrate with the bonding composition and contacting the treated surface of the substrate with a surface of the fluoropolymer.

15. The method of claim 1, wherein providing includes forming a mixture of the substrate and the bonding composition and contacting a surface of the mixture with a surface of the fluoropolymer.

16. The method of claim 1, wherein the substrate includes an inorganic substrate.

17. The method of claim 16, wherein the inorganic substrate is selected from the group consisting of a metal and a glass.

18. The method of claim 1, wherein the substrate includes an organic substrate.

19. The method of claim 18, wherein the organic substrate includes a non-fluorinated polymer.

20. The method of claim 1, further comprising heating the bonding composition after exposure to actinic radiation.

21. The method of claim 1, wherein the bonding composition is exposed to actinic radiation through the fluoropolymer.

22. The method of claim 1, wherein the light-absorbing electron donor is polymerizable.

23. The method of claim 1, wherein the actinic radiation has a wavelength maximum of between 210 nm and 290 nm.

24. The method of claim 1, further comprising applying heat or pressure to the bonding composition between a fluoropolymer and a substrate.

25. The method of claim 1, wherein the light-absorbing electron donor includes a fluorinated moiety.

26. The method of claim 1, wherein the light-absorbing electron donor includes a polyethyleneimine.

27. A method of bonding a fluoropolymer to a substrate comprising:
    treating a surface of a fluoropolymer with a bonding composition, the bonding composition including an aromatic amine;
    contacting the treated surface of the fluoropolymer with a surface of a substrate; and
    exposing the bonding composition to actinic radiation, wherein the bonding composition is exposed to actinic radiation through the fluoropolymer, through the substrate, or both.

28. The method of claim 27, wherein the aromatic amine is an aniline.

29. The method of claim 28, wherein the aniline is selected from the group consisting of an N,N-dialkylaniline, an N-alkylaniline, a fluorinated aniline, and aniline.

30. The method of claim 27, wherein the bonding composition includes a primary amine.

31. The method of claim 30, wherein the primary amine is an alkenylamine.

32. The method of claim 27, wherein the bonding composition includes an amino-substituted organosilane.

33. The method of claim 32, wherein the amino-substituted organosilane is an amino-substituted organosilane having a hydrolyzable substituent.

34. The method of claim 27, wherein the bonding composition includes an onium salt.

35. The method of claim 27, wherein the fluoropolymer is a perfluorinated polymer.

36. The method of claim 35, wherein the perfluorinated polymer is a fluorinated ethylene and propylene polymer.

37. The method of claim 27, wherein the substrate includes an inorganic substrate.

38. The method of claim 37, wherein the inorganic substrate is selected from the group consisting of a metal and a glass.

39. The method of claim 27, wherein the substrate include an organic substrate.

40. The method of claim 39, wherein the organic substrate includes a non-fluorinated polymer.

41. The method of claim 27, further comprising heating the bonding composition after exposure to actinic radiation.

42. The method of claim 27, wherein the bonding composition is exposed to actinic radiation through the fluoropolymer.

43. The method of claim 27, wherein the actinic radiation has a wavelength maximum of between 210 nm and 290 nm.

44. The method of claim 1, wherein the light absorbing electron donor is a fluorinated amine.

* * * * *

UNITED STATES PATENT AND TRADEMARK OFFICE
CERTIFICATE OF CORRECTION

PATENT NO.   : 6,685,793 B2
DATED        : February 3, 2004
INVENTOR(S)  : Jing, Naiyong It is certified that error appears in the above-identified patent and that said Letters Patent is hereby corrected as shown below:

Column 20,
Line 10, "F NMR:" should read -- $^{19}$F NMR: --

Signed and Sealed this

Sixth Day of July, 2004

JON W. DUDAS
*Acting Director of the United States Patent and Trademark Office*